US012606692B2

(12) United States Patent
Kousaka

(10) Patent No.: US 12,606,692 B2
(45) **Date of Patent: *Apr. 21, 2026**

(54) SPECTACLE LENS

(71) Applicant: HOYA LENS THAILAND LTD., Pathumthani (TH)

(72) Inventor: Masahisa Kousaka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 559 days.

This patent is subject to a terminal disclaimer.

(21) Appl. No.: 18/080,519

(22) Filed: Dec. 13, 2022

(65) Prior Publication Data

US 2023/0111587 A1 Apr. 13, 2023

Related U.S. Application Data

(63) Continuation of application No. PCT/JP2021/036169, filed on Sep. 30, 2021.

(30) Foreign Application Priority Data

Sep. 30, 2020 (JP) ................................ 2020-165102

(51) Int. Cl.

| | |
|---|---|
| ***C08K 5/3475*** | (2006.01) |
| ***C08G 75/08*** | (2006.01) |
| ***G02B 1/04*** | (2006.01) |
| ***G02C 7/10*** | (2006.01) |

(52) U.S. Cl.

CPC ............ *C08K 5/3475* (2013.01); *C08G 75/08* (2013.01); *G02B 1/041* (2013.01); *G02C 7/108* (2013.01)

(58) Field of Classification Search

CPC ...................................................... G02B 1/041

See application file for complete search history.

(56) References Cited

U.S. PATENT DOCUMENTS

| | | | | |
|---|---|---|---|---|
| 10,676,447 | B2 * | 6/2020 | Iwamoto | C07D 249/20 |
| 2003/0047722 | A1 | 3/2003 | Fujita et al. | |
| 2003/0176542 | A1 | 9/2003 | Abe et al. | |
| 2014/0296431 | A1 * | 10/2014 | Kousaka | C08G 18/757 524/710 |
| 2015/0370094 | A1 | 12/2015 | Hashimoto et al. | |
| 2018/0059437 | A1 * | 3/2018 | Kousaka | G02C 7/02 |
| 2018/0339474 | A1 * | 11/2018 | Goto | B29D 11/00644 |
| 2020/0031782 | A1 | 1/2020 | Iwamoto et al. | |
| 2020/0231840 | A1 | 7/2020 | Momoda et al. | |
| 2022/0056170 | A1 | 2/2022 | Ayako et al. | |

(Continued)

FOREIGN PATENT DOCUMENTS

| | | | |
|---|---|---|---|
| EP | 4032879 | A1 | 7/2022 |
| JP | 2003253140 | A | 9/2003 |
| JP | 2008169312 | A | 7/2008 |

(Continued)

OTHER PUBLICATIONS

PCT/JP2021/036169, English Translation of "International Search Report", Dec. 7, 2021, 3 pages.

*Primary Examiner* — Michael F Pepitone
(74) *Attorney, Agent, or Firm* — Sughrue Mion, PLLC

(57) ABSTRACT

One embodiment according to the present disclosure relates to a spectacle lens containing a compound having a maximum absorption wavelength of 350 nm or more and 365 nm or less and a molar extinction coefficient of 20,000 l/mol·cm or more.

19 Claims, 1 Drawing Sheet

(56) References Cited

U.S. PATENT DOCUMENTS

2022/0056187 A1 2/2022 Hanasaki et al.

FOREIGN PATENT DOCUMENTS

| | | | | |
|---|---|---|---|---|
| JP | 2012181268 A | | 9/2012 | |
| JP | 2013238634 A | | 11/2013 | |
| WO | 2002041042 A1 | | 5/2002 | |
| WO | 2014133111 A1 | | 2/2017 | |
| WO | WO-2018180632 A1 | * | 10/2018 | ........... C07D 249/20 |
| WO | 2018230513 A1 | | 12/2018 | |
| WO | 2020129930 A1 | | 11/2021 | |
| WO | 2020129933 A1 | | 11/2021 | |
| WO | 2020162592 A1 | | 11/2021 | |

* cited by examiner

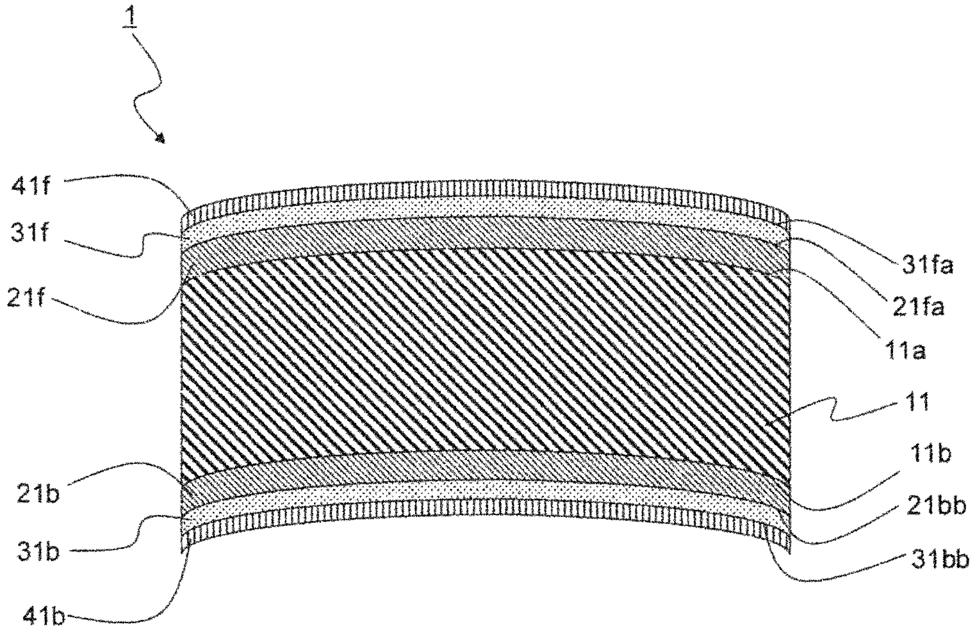
1
41f
31f
21f
31fa
21fa
11a
11
11b
21b
21bb
31b
31bb
41b

SPECTACLE LENS

CROSS-REFERENCE TO RELATED APPLICATIONS

This application is a continuation of International Application No. PCT/JP2021/036169, filed on Sep. 30, 2021, which claims priority to Japanese Patent Application No. 2020-165102, and the contents of which are incorporated by reference.

TECHNICAL FIELD

The present disclosure relates to a spectacle lens.

BACKGROUND ART

In spectacle lenses, when light beams in a blue region (wavelength range of 380 to 500 nm) are cut, glare is reduced, and visibility and contrast are improved. In addition, for eye health, since light beams in a blue region (380 to 500 nm) have a high energy, they are said to cause damage to the retina and the like. Damage caused by blue light is called "blue light hazard," and it is said that particularly the vicinity of 380 to 420 nm on the low wavelength side is most dangerous, and it is desirable to cut light in this region.

PTL 1 describes an optical material that contains one or more UV absorbing agents (a) having a maximum absorption peak in a range of 350 nm or more and 370 nm or less and has a thickness of 2 mm in which the measured light transmittance satisfies the following properties (1) to (3) [(1) the light transmittance at a wavelength of 410 nm is 10% or less, (2) the light transmittance at a wavelength of 420 nm is 70% or less, and (3) the light transmittance at a wavelength of 440 nm is 80% or more].

CITATION LIST

Patent Literature

[PTL 1] WO 2014/133111

SUMMARY

Technical Problem

According to the conventional spectacle lens as disclosed in PTL 1, when a specific UV absorbing agent is contained, it is possible to reduce the transmittance of light with a wavelength of 410 nm. However, in order to obtain a desired transmittance of light with a wavelength of 410 nm, the content of the UV absorbing agent needs to be increased, which causes a problem of the Abbe number of the spectacle lens substrate decreasing.

One embodiment of the present disclosure relates to a spectacle lens having excellent blue cut and exhibiting a high Abbe number.

Solution to Problem

One embodiment according to the present disclosure relates to a spectacle lens containing a compound having a maximum absorption wavelength of 350 nm or more and 365 nm or less and a molar extinction coefficient of 20,000 l/mol·cm or more.

Advantageous Effects

According to one embodiment of the present disclosure, it is possible to provide a spectacle lens having excellent blue cut and exhibiting a high Abbe number.

BRIEF DESCRIPTION OF DRAWINGS

FIG. 1 is a schematic cross-sectional view of a spectacle lens 1 according to the present embodiment.

DESCRIPTION OF EMBODIMENTS

Hereinafter, embodiments according to the present disclosure will be described in detail with reference to the drawings as necessary, but the present disclosure is not limited thereto, and can be variously modified without departing from the scope and spirit thereof. Here, in the drawings, the same components are denoted with the same reference numerals and redundant descriptions are omitted. In addition, positional relationships such as above, below, left and right are based on the positional relationships shown in the drawings unless otherwise specified. In addition, dimensional ratios in the drawings are not limited to the illustrated ratios.

Here, in this specification, for example, the expression of a numerical value range of "1 to 100" includes both the lower limit value "1" and the upper limit value "100." In addition, the same applies to the expression of other numerical value ranges.

For example, "a cured product of an isocyanate component and an active hydrogen compound component" does not mean that other components are excluded but means that a cured composition contains at least an isocyanate component and an active hydrogen compound component.

Spectacle Lens

A spectacle lens according to the present embodiment relates to a spectacle lens containing a compound (hereinafter referred to as "Compound 1") having a maximum absorption wavelength of 350 nm or more and 365 nm or less and a molar extinction coefficient of 20,000 l/mol·cm or more.

According to one embodiment of the present disclosure, it is possible to provide a spectacle lens having excellent blue cut and exhibiting a high Abbe number.

Light with a wavelength of 410 nm has a relatively high energy although it is light in a visible light region so that it is harmful to the eyes when viewed for a long time. However, in order to reduce the transmittance of light with a wavelength of 410 nm, it is required to add a large amount of an aromatic compound. However, when Compound 1 having a maximum absorption wavelength of 350 nm or more and 365 nm or less and a molar extinction coefficient of 20,000 l/mol·cm or more is used, even if a small amount thereof is added, it is possible to reduce the transmittance of light with a wavelength of 410 nm, and it is possible to provide a spectacle lens exhibiting a high Abbe number.

The maximum absorption wavelength of Compound 1 may be 352 nm or more and 363 nm or less, or may be 355 nm or more and 362 nm or less.

Regarding the method of measuring a maximum absorption wavelength, the method described in examples is used.

The molar extinction coefficient of Compound 1 may be 23,000 l/mol·cm or more, may be 25,000 l/mol·cm or more, or may be 28,000 l/mol·cm or more. The upper limit value of the molar extinction coefficient of Compound 1 is not particularly limited, and is, for example, 30,000 l/mol·cm or less. Regarding the method of measuring a molar extinction coefficient, the method described in examples is used.

The above Compound 1 can be achieved according to molecular design of the compound used. For example, it can be obtained by designing the π conjugation length in an appropriate range by substituting an appropriate substituent on a benzotriazole ring.

Specific examples of Compound 1 are not particularly limited, and examples thereof include 2-ethylhexyl 2-(2-hydroxy-4-methoxyphenyl)2H-benzotriazole-5-carboxylate (Compound represented by the following Formula (1-1)),

[C1]

(1-1)

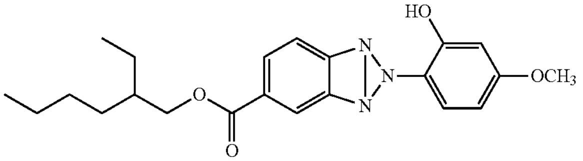

2-ethylhexyl 2-(2-hydroxy-4-ethoxyphenyl)2H-benzotriazole-5-carboxylate(Compound represented by the following Formula (1-2)),

[C2]

(1-2)

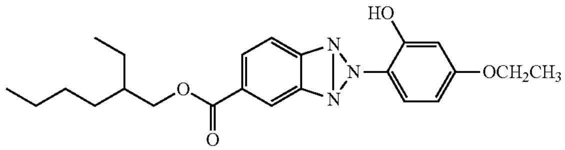

2-ethylhexyl 2-(2-hydroxy-4-octyloxyphenyl)2H-benzotriazole-5-carboxylate, methyl 2-(2-hydroxy-4-methoxyphenyl)2H-benzotriazole-5-carboxylate, methyl 2-(2-hydroxy-4-ethoxyphenyl)2H-benzotriazole-5-carboxylate, methyl 2-(2-hydroxy-4-octyloxyphenyl)2H-benzotriazole-5-carboxylate, ethyl 2-(2-hydroxy-4-methoxyphenyl)2H-benzotriazole-5-carboxylate, ethyl 2-(2-hydroxy-4-ethoxyphenyl)2H-benzotriazole-5-carboxylate, ethyl 2-(2-hydroxy-4-octyloxyphenyl)2H-benzotriazole-5-carboxylate, n-octyl 2-(2-hydroxy-4-methoxyphenyl)2H-benzotriazole-5-carboxylate, n-octyl 2-(2-hydroxy-4-ethoxyphenyl)2H-benzotriazole-5-carboxylate, and n-octyl 2-(2-hydroxy-4-octyloxyphenyl)2H-benzotriazole-5-carboxylate.

These compounds 1 may be used alone or two or more thereof may be used in combination.

Among these, the compound 1 may be 2-ethylhexyl 2-(2-hydroxy-4-methoxyphenyl)2H-benzotriazole-5-carboxylate, or 2-ethylhexyl 2-(2-hydroxy-4-ethoxyphenyl)2H-benzotriazole-5-carboxylate.

The spectacle lens according to the present embodiment includes, for example, a lens substrate. The spectacle lens according to the present embodiment may include at least one layer selected from the group consisting of a hard coat layer, a foundation layer, and an antireflection layer.

FIG. 1 is a schematic cross-sectional view of a spectacle lens 1 according to the present embodiment. The spectacle lens 1 according to the present embodiment includes a lens substrate 11, a hard coat layer 21*f* provided on the side of an object-side surface 11*a* of the lens substrate 11, a functional layer 31*f* provided on the side of an object-side surface 21*fa* of the hard coat layer 21*f*, and a water-repellent layer 41*f* provided on the side of an object-side surface 31*fa* of the functional layer 31*f*.

In addition, when the lens substrate 11 is a finished lens, the spectacle lens 1 according to the present embodiment further includes a hard coat layer 21*b* provided on the side of an eyeball-side surface 11*b* of the lens substrate 11, a functional layer 31*b* provided on the side of an eyeball-side surface 21*bb* of the hard coat layer 21*b*, and a water-repellent layer 41*b* provided on the side of an eyeball-side surface 31*bb* of the functional layer 31*b*.

Here, although not shown, a foundation layer may be provided between the lens substrate 11 and the hard coat layer 21*f* or between the lens substrate 11 and the hard coat layer 21*b*.

Lens Substrate

The lens substrate may contain Compound 1 and a resin. The spectacle lens may contain 0.05 parts by mass or more and 2.00 parts by mass or less of Compound 1 with respect to 100 parts by mass of the resin in the lens substrate. In order to further reduce the transmittance of light with a wavelength of 410 nm and further improve the transmittance of light with a wavelength of 430 nm, the content of Compound 1 with respect to 100 parts by mass of the resin in the lens substrate may be 0.10 parts by mass or more and 2.00 parts by mass or less, may be 0.15 parts by mass or more and 1.50 parts by mass or less, or may be 0.20 parts by mass or more and 1.00 part by mass or less.

In order to further reduce the transmittance of light with a wavelength of 410 nm, further improve the transmittance of light with a wavelength of 430 nm, and minimize a decrease in the Abbe number, the content of Compound 1 with respect to 100 parts by mass of the resin in the lens substrate may be 0.05 parts by mass or more and 0.60 parts by mass or less, may be 0.10 parts by mass or more and 0.55 parts by mass or less, or may be 0.20 parts by mass or more and 0.50 parts by mass or less.

Resin

Examples of resins for lens substrates include urethane resins, episulfide resins, polycarbonate resins, and acrylic resins.

The resin may be at least one selected from among polythiourethane resins, polysulfide resins, and polyurethane resins, or may be at least one selected from the group consisting of polythiourethane resins and polysulfide resins.

Urethane Resin

The urethane resin is a cured product of a polymerizable composition containing an isocyanate component and an active hydrogen compound component. Examples of urethane resins include a thiourethane resin having a polymerization moiety of an isocyanate component and a polythiol component; a urethane resin having a polymerization moiety of an isocyanate component and a polyol component; and a urethane urea resin having a polythiourethane moiety which is a polymerization moiety of an isocyanate component and a polythiol component or a polythiol component and a polyurea moiety which is a polymer of an isocyanate component and a polyamine component.

Isocyanate Component

Examples of isocyanate components include polyisocyanate compounds having an aromatic ring, polyisocyanate compounds having an aliphatic ring, and linear or branched aliphatic polyisocyanate compounds.

Examples of polyisocyanate compounds having an aromatic ring include diisocyanatobenzene, 2,4-tolylene diisocyanate, 2,6-tolylene diisocyanate, ethyl phenylene diisocyanate, isopropyl phenylene diisocyanate, diethyl phenylene diisocyanate, diethyl phenylene diisocyanate, diisopropyl phenylene diisocyanate, trimethylbenzene triisocyanate, benzene triisocyanate, biphenyl diisocyanate, 4,4'-diphenylmethane diisocyanate, 4,4'-methylenebis(2-methylphenylisocyanate), bibenzyl-4,4'-diisocyanate, bis(isocyanatophenyl)ethylene, 1,3-bis(isocyanatomethyl)benzene, 1,4-bis(isocyanatomethyl)benzene, 1,3-bis (isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethylphenyl)ether, 2-isocyanatophenyl-4-isocyanatophenyl sulfide, bis(4-isocyanatophenyl)sulfide, bis(4-isocyanatomethylphenyl)sulfide, bis(4-isocyanatophenyl) disulfide, bis(2-methyl-5-isocyanatophenyl)disulfide, bis(3-methyl-5-isocyanatophenyl)disulfide, bis(3-methyl-6-isocyanatophenyl)disulfide, bis(4-methyl-5-isocyanatophenyl)disulfide, bis(3-methyloxy-4-isocyanatophenyl)disulfide, and bis(4-methyloxy-3-isocyanatophenyl)disulfide.

Examples of polyisocyanate compounds having an aliphatic ring include 1,3-diisocyanatocyclohexane, 1,4-diisocyanatocyclohexane, isophorone diisocyanate, 1,3-bis(isocyanatomethyl)cyclohexane, 1,4-bis(isocyanatomethyl) cyclohexane, dicyclohexylmethane-4,4'-diisocyanate, dicyclohexylmethane-2,4'-diisocyanate, 2,5-bis(isocyanatomethyl)-bicyclo[2.2.1]heptane, 2,6-bis(isocyanatomethyl)-bicyclo[2.2.1]heptane, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane.

Examples of linear or branched aliphatic polyisocyanate compounds include pentamethylene diisocyanate, hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylenetriisocyanate, 1,8-diisocyanato-4-isocyanatomethyloctane, bis(isocyanatoethyl)carbonate, bis (isocyanatoethyl)ether, lysine diisocyanatomethyl ester, lysine triisocyanate, bis(isocyanatomethyl)sulfide, bis(isocyanatoethyl)sulfide, bis(isocyanatopropyl)sulfide, bis(isocyanatohexyl)sulfide, bis(isocyanatomethyl)sulfone, bis (isocyanatomethyl)disulfide, bis(isocyanatoethyl)disulfide, bis(isocyanatopropyl)disulfide, bis(isocyanatomethylthio) methane, bis(isocyanatoethylthio)methane, bis(isocyanatomethylthio)ethane, bis(isocyanatoethylthio)ethane, 1,5-diisocyanato-2-isocyanatomethyl-3-pentane, 1,2,3-tris (isocyanatomethylthio)propane, 1,2,3-tris (isocyanatoethylthio)propane, 3,5-dithia-1,2,6,7-heptanetetraisocyanate, 2,6-diisocyanatomethyl-3,5-dithia-1,7-heptane diisocyanate, 2,5-diisocyanatomethylthiophene, 4-isocyanatoethylthio-2,6-dithia-1,8-octanediisocyanate, 1,2-diisothiocyanatoethane, and 1,6-diisothiocyanatohexane. These may be used alone or two or more thereof may be used.

The isocyanate component may contain at least one (hereinafter referred to as a "preferred isocyanate compound") selected from the group consisting of bis(isocyanatomethyl)bicyclo[2.2.1]heptane, bis(isocyanatomethyl) cyclohexane, bis(isocyanatomethyl)benzene, tolylene diisocyanate, diphenylmethane diisocyanate, dicyclohexylmethane diisocyanate, hexamethylene diisocyanate, and pentamethylene diisocyanate.

Bis(isocyanatomethyl)bicyclo[2.2.1]heptane includes, for example, one or more selected from the group consisting of 2,5-bis(isocyanatomethyl)bicyclo[2.2.1]heptane and 2,6-bis (isocyanatomethyl)bicyclo[2.2.1]heptane, and may be a mixture of 2,5-bis(isocyanatomethyl)bicyclo[2.2.1]heptane and 2,6-bis(isocyanatomethyl)bicyclo[2.2.1]heptane.

Examples of bis(isocyanatomethyl)cyclohexane include 1,3-bis(isocyanatomethyl)cyclohexane and 1,4-bis(isocyanatomethyl)cyclohexane. Among these, bis(isocyanatomethyl)cyclohexane may be 1,3-bis(isocyanatomethyl) cyclohexane.

Examples of bis(isocyanatomethyl)benzene include 1,3-bis (isocyanatomethyl)benzene and 1,4-bis(isocyanatomethyl) benzene. Among these, bis(isocyanatomethyl)cyclohexane may be 1,3-bis(isocyanatomethyl)benzene.

Examples of tolylene diisocyanates include 2,4-tolylene diisocyanate and 2,6-tolylene diisocyanate. Among these, the tolylene diisocyanate may be 2,4-tolylene diisocyanate.

Examples of diphenylmethane diisocyanates include 4,4'-diphenylmethane diisocyanate and 2,4'-diphenylmethane diisocyanate.

Examples of dicyclohexylmethane diisocyanates include dicyclohexylmethane-4,4'-diisocyanate.

In the isocyanate component, the content of the above "preferred isocyanate compound" may be 80 mass % or more, may be 90 mass % or more, or may be 95 mass % or more and 100 mass % or less.

Active Hydrogen Compound Component

Examples of active hydrogen compound components include polythiol components, polyol components, and polyamine components.

Polythiol Component

Examples of polythiol components include ester compounds of a polyol compound and a carboxylic acid compound containing mercapto groups, linear or branched aliphatic polythiol compounds, polythiol compounds having an aliphatic ring, and polythiol compounds having an aromatic ring.

In the ester compound of a polyol compound and a carboxylic acid compound containing mercapto groups, examples of polyol compounds include compounds containing two or more hydroxyl groups in the molecule. Here, examples of polyol compounds include ethylene glycol, diethylene glycol, propanediol, propanetriol, butanediol, trimethylolpropane, bis(2-hydroxyethyl)disulfide, pentaerythritol, and dipentaerythritol.

Examples of carboxylic acid compounds containing mercapto groups include thioglycolic acid, mercaptopropionic acid, thiolactic acid compounds, and thiosalicylic acid.

Examples of ester compounds of a polyol compound and a carboxylic acid compound containing mercapto groups include ethylene glycol bis(2-mercaptoacetate), ethylene glycol bis(3-mercaptopropionate), diethylene glycol bis(2-mercaptoacetate), diethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), dipentaerythritol hexakis(2-mercaptoacetate), and dipentaerythritol hexakis(3-mercaptopropionate).

Examples of linear or branched aliphatic polythiol compounds include 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 2,2-dimethylpropane-1,3-dithiol, 3,4-dimethyloxybutane-1,2-dithiol, 2,3-dimercapto-1-propanol, 1,2-dimercaptopropyl methyl ether, 2,3-dimercaptopropyl methyl ether, dimercaptoethyl ether, 2-(2-mercaptoethylthio)propane-1,3-dithiol, 2,2-bis(mercaptomethyl)-1,3-propanedithiol, bis(mercaptomethylthio) methane, tris(mercaptomethylthio)methane, bis(2-mercaptoethylthio)methane, 1,2-bis(mercaptomethylthio)ethane, 1,2-bis(2-mercaptoethylthio)ethane, 1,3-bis(mercaptomethylthio)propane, 1,3-bis(2-mercaptoethylthio)propane, 1,1,2,2-tetrakis(mercaptoethylthio)ethane, 1,1,3,3-tetrakis(mercaptoethylthio)propane, 3-mercaptomethyl-1,5-dimercapto-2,4-dithiapentane, tetrakis(mercaptoethylthio)propane, bis (2-mercaptoethyl)ether, bis(2-mercaptoethyl)sulfide, bis(2-mercaptoethyl)disulfide, 1,2-bis(2-mercaptoethylthio)-3-mercaptopropane, 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis (mercaptomethyl)-3,6,9-trithiaundecane-1,11-dithiol.

Examples of polythiol compounds having an aliphatic ring include 1,1-cyclohexanedithiol, 1,2-cyclohexanedithiol, methylcyclohexanedithiol, bis(mercaptomethyl)cyclohexane, 2-(2,2-bis(mercaptomethylthio)ethyl)-1,3-dithiethane, 2,5-bis(mercaptomethyl)-1,4-dithiane, and 4,8-bis (mercaptomethyl)-1,3-dithiane.

Examples of polythiol compounds having an aromatic ring include 1,3-dimercaptobenzene, 1,4-dimercaptobenzene, 1,3-bis(mercaptomethyl)benzene, 1,4-bis(mercaptomethyl)benzene, 1,3-bis(mercaptoethyl)benzene, 1,4-bis(mercaptoethyl)benzene, 1,3,5-trimercaptobenzene, 1,3,5-tris (mercaptomethyl)benzene, 1,3,5-tris(mercaptoethyl) benzene, 4,4'-dimercaptobiphenyl, 4,4'-dimercaptobibenzyl, 2,5-toluenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methyloxyphenyl)propane-2,2-dithiol, 1,3-diphenylpropane-2,2-dithiol, phenylmethane-1,1-dithiol, and 2,4-di(p-mercaptophenyl)pentane.

These may be used alone or two or more thereof may be used.

Polyol Component

Examples of polyol components include ethylene glycol, diethylene glycol, propanediol, propanetriol, butanediol, trimethylolpropane, bis(2-hydroxyethyl)disulfide, pentaerythritol, and dipentaerythritol.

Polyamine Component

Examples of polyamine components include polymethylenediamine, polyetherdiamine, diethylenetriamine, iminobispropylamine, bishexamethylenetriamine, diethylenetriamine, tetraethylenepentamine, pentaethylenehexaamine, pentaethylenehexaamine, dimethylaminopropylamine, aminoethylethanolamine, methyliminobispropylamine, methanediamine, N-aminomethylbiperazine, 1,3-diaminocyclohexane, isophoronediamine, meta-xylenediamine, tetrachloroparaxylylenediamine, metaphenylenediamine, 4,4'-methylenedianiline, diaminodiphenylsulfone, benzidine, diaminodiphenyl ether, 4,4'-thiodianiline, 4,4'-bis(o-toluidine)dianisidine, o-phenylenediamine, 2,4-toluenediamine, 2,5-toluenediamine, methylenebis(o-chloroaniline), diaminiditolylsulfone, bis(3,4-diaminophenyl)sulfone, 2,6-diaminopyridine, 4-chloro-o-phenylenediamine, 4-methoxy-6-methyl-m-phenylenediamine, m-aminobenzylamine, N,N,N',N'-tetramethyl-1,3-butanediamine, N,N,N',N'-tetramethyl-p-phenylenediamine, tetramethylguanidine, 2-dimethylamino-2-hydroxypropane, pyrazine, 2,4,6-tris(dimethylaminomethylol)phenol, N-methylpiperazine, N-β(aminoethyl)γ-aminopropyltrimethoxysilane, N-β(aminoethyl)γ-aminopropylmethyldimethoxysilane, and γ-aminopropylmethyldimethoxysilane.

The active hydrogen compound component may include at least one selected from the group consisting of toluenediamine, pentaerythritol tetrakismercaptoacetate, pentaerythritol tetrakismercaptopropionate, trimethylolpropane trismercaptoacetate, trimethylolpropane trismercaptopropionate, bis(mercaptoethylthio)mercaptopropane, bis(mercaptomethyl)-3,6,9-trithiaundecandithiol, dimercaptoethyl sulfide, bis(mercaptomethyl)dithiane, dimercaptoethyl ether and diethylene glycol.

Examples of toluenediamines include 2,4-toluenediamine and 2,5-toluenediamine.

Examples of pentaerythritol tetrakismercaptoacetate include pentaerythritol tetrakis(2-mercaptoacetate).

Examples of pentaerythritol tetrakismercaptopropionate include pentaerythritol tetrakis(3-mercaptopropionate).

Examples of trimethylolpropane trismercaptoacetate include trimethylolpropane tris(2-mercaptoacetate).

Examples of trimethylolpropane trismercaptopropionate include trimethylolpropane tris(3-mercaptopropionate).

Examples of bis(mercaptoethylthio)mercaptopropane include 1,2-bis(2-mercaptoethylthio)-3-mercaptopropane.

Examples of bis(mercaptomethyl)-3,6,9-trithiaundecandithiol include 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol. Bis(mercaptomethyl)-3,6,9-trithiaundecandithiol may be a mixture of 4,7-bis (mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

The active hydrogen compound component may be a polythiol component.

The polythiol component may include at least one selected from the group consisting of 2,5-bis(mercaptomethyl)-1,4-dithiane, pentaerythritol tetrakis(2-mercaptoacetate), pentaerythritol tetrakis(3-mercaptopropionate), 4-mercaptomethyl-1,8-dimercapto-3,6-dithiaoctane, 4,7-bis (mercaptomethyl)-3,6,9-trithiaundecane-1,11-dithiol, 4,8- bis(mercaptomethyl)-3,6,9-trithiaundecane-1,11-dithiol, 5,7-bis(mercaptomethyl)-3,6,9-trithiaundecane-1,11-dithiol, trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate), may be at least one selected from the group consisting of 4,7-bis(mercaptomethyl)-3,6,9-trithiaundecane-1,11-dithiol, 4,8-bis(mercaptomethyl)-3,6,9-trithiaundecane-1,11-dithiol, 5,7-bis(mercaptomethyl)-3,6,9-trithiaundecane-1,11-dithiol, 4-mercaptomethyl-1,8-dimercapto-3,6-dithiaoctane, pentaerythritol tetrakis(3-mercaptopropionate), 2,5-bis(mercaptomethyl)-1,4-dithiane, and pentaerythritol tetrakis(2-mercaptoacetate), may be at least one selected from the group consisting of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol, or may be a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

The amount of the above polythiol component in the polythiol component may be 50 mass % or more, may be 70 mass % or more, may be 90 mass % or more, may be 95 mass % or more, and 100 mass % or less.

The equivalent ratio of mercapto groups of the polythiol component and isocyanato groups of the polyisocyanate component (mercapto group/isocyanato group) may be 40/60 or more, may be 43/57 or more, may be 45/55 or more, and may be 60/40 or less, may be 55/45 or less, or may be 53/47 or less.

A total content of the polythiol component and the polyisocyanate component in the polymerizable composition may be 80 mass % or more, may be 90 mass % or more, may be 95 mass % or more, and 100 mass % or less.

Episulfide Resin

The episulfide resin is a cured product of a polymerizable composition containing an epithio compound. Here, the polymerizable composition may contain other monomers.

Epithio Compound

The epithio compound is a compound having episulfide groups (epithio groups).

Examples of epithio compounds include episulfide compounds having a linear or branched aliphatic framework, episulfide compounds having an alicyclic framework, episulfide compounds having an aromatic framework, and episulfide compounds having a dithiane ring framework.

Examples of episulfide compounds having a linear or branched aliphatic framework include bis-(β-epithiopropyl)sulfide, bis-(β-epithiopropyl)disulfide, 2-(2-(β-epithiopropylthioethylthio)-1,3-bis(β-epithiopropylthio)propane, 1,2-bis[(2-β-epithiopropylthioethyl)thio]-3-(β-epithiopropylthio) propane, tetrakis(β-epithiopropylthiomethyl)methane, and 1,1,1-tris(β-epithiopropylthiomethyl)propane.

Examples of episulfide compounds having an alicyclic framework include 1,3-bis(β-epithiopropylthio)cyclohexane, 1,4-bis(β-epithiopropylthio)cyclohexane, 1,3-bis(β-epithiopropylthiomethyl)cyclohexane, 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane, and bis[4-(β-epithiopropylthio)cyclohexyl]sulfide.

Examples of episulfide compounds having an aromatic framework include 1,3-bis(β-epithiopropylthio)benzene, 1,4-bis(3-epithiopropylthio)benzene, 1,3-bis(β-epithiopropylthiomethyl)benzene, 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfine, and 4,4-bis(β-epithiopropylthio)biphenyl.

Examples of episulfide compounds having a dithiane ring framework include 2,5-bis(β-epithiopropylthiomethyl)-1,4-dithiane, 2,5-bis(β-epithiopropylthioethylthiomethyl)-1,4-dithiane, 2,5-bis(β-epithiopropylthioethyl)-1,4-dithiane, and 2,3,5-tri(β-epithiopropylthioethyl)-1,4-dithiane.

In addition to the epithio compound, other polymerizable components such as the above polyisocyanate component and polythiol component may be added.

Among these, the episulfide compound may be an episulfide compound having a linear or branched aliphatic framework, and bis-(β-epithiopropyl)sulfide or bis-(β-epithiopropyl)disulfide.

The content of the epithio compound in the polymerizable composition may be 50 mass % or more, may be 60 mass % or more, may be 70 mass % or more, may be 80 mass % or more, may be 90 mass % or more, and may be 98 mass % or less, or may be 96 mass % or less.

The polymerizable composition may further contain sulfur or a polythiol compound in combination with the epithio compound.

The content of sulfur in the polymerizable composition may be 1 mass % or more, may be 5 mass % or more, may be 10 mass % or more, and may be 30 mass % or less, or may be 20 mass % or less.

Examples of polythiol compounds include the compounds exemplified above.

When used in combination with an epithio compound, the content of the polythiol compound in the polymerizable component may be 2 mass % or more, may be 4 mass % or more, and may be 50 mass % or less, may be 40 mass % or less, may be 30 mass % or less, may be 20 mass % or less, or may be 10 mass % or less.

When the polymerizable composition contains a polyisocyanate component and a polythiol component or an epithio compound, it may contain a polymerization catalyst.

Examples of polymerization catalysts include tin compounds and nitrogen-containing compounds.

Examples of tin compounds include alkyltin compounds and alkyltin halide compounds.

Examples of alkyltin compounds include dibutyltin diacetate and dibutyltin dilaurate.

Examples of alkyltin halide compounds include dibutyltin dichloride, dimethyltin dichloride, monomethyltin trichloride, trimethyltin chloride, tributyltin chloride, tributyltin fluoride, and dimethyltin dibromide.

Among these, the polymerization catalyst may be dibutyltin diacetate, dibutyltin dilaurate, dibutyltin dichloride, or dimethyltin dichloride, or may be dimethyltin dichloride.

Examples of nitrogen-containing compounds include tertiary amines, quaternary ammonium salts, imidazole compounds, and pyrazole compounds. Tertiary amines may be hindered amines.

Examples of tertiary amines include triethylamine, tri-n-propylamine, triisopropylamine, tri-n-butylamine, triisobutylamine, N,N-dimethylbenzylamine, N-methylmorpholine, N,N-dimethylcyclohexylamine, pentamethyldiethylenetriamine, bis(2-dimethylaminoethyl) ether, N-methylmorpholine, N,N'-dimethylpiperazine, N,N,N',N'-tetramethylethylenediamine, and 1,4-diazabicyclo[2.2.2]octane(DABCO).

Examples of hindered amines 1,2,2,6,6-pentamethyl-4-piperidinol, 1,2,2,6,6-pentamethyl-4-hydroxyethyl-4-piperidinol, methyl-1,2,2,6,6-pentamethyl-4-piperidyl sebacate, a mixture of methyl-1,2,2,6,6-pentamethyl-4-piperidyl sebacate and bis(1,2,2,6,6-pentamethyl-4-piperidyl)sebacate, bis(1,2,2,6,6-pentamethyl-4-piperidyl)sebacate, bis(2,2,6,6-tetramethyl-1-(octyloxy)-4-piperidyl)sebacate, bis(1,2,2,6,6-pentamethyl-4-piperidyl) [[3,5-bis(1,1-dimethylethyl)-4-hydroxyphenyl]methyl]butylmalonate, and tetrakis(1,2,2,6,6-pentamethyl-4-piperidyl)butane-1,2,3,4-tetracarboxylate.

Examples of quaternary ammonium salts include tetraethylammonium hydroxide.

Examples of imidazole compounds include imidazole, 1-methyl-2-mercapto-1H-imidazole, 1,2-dimethylimidazole, benzylmethylimidazole, and 2-ethyl-4-imidazole.

Examples of pyrazole compounds include pyrazole and 3,5-dimethylpyrazole.

Among these, the nitrogen-containing compound may be tertiary amines such as hindered amines, imidazole compounds, or pyrazole compounds, may be imidazole compounds, or may be 1-methyl-2-mercapto-1H-imidazole.

When an isocyanate component and an active hydrogen compound component are contained, the amount of the polymerization catalyst added in the polymerizable composition with respect to a total amount of 100 parts by mass of the isocyanate component and the active hydrogen compound component may be 0.001 parts by mass or more, may be 0.005 parts by mass or more, may be 0.007 parts by mass or more, and may be 2 parts by mass or less, may be 1 part by mass or less, or may be 0.5 parts by mass or less.

When an epithio compound is contained, the amount of the polymerization catalyst added in the polymerizable composition with respect to a total amount of 100 parts by mass of the polymerizable component may be 0.001 parts by mass or more, may be 0.005 parts by mass or more, may be 0.007 parts by mass or more, and may be 2 parts by mass or less, may be 1 part by mass or less, or may be 0.5 parts by mass or less.

Polycarbonate Resin

The polycarbonate resin may be a cured product of a polymerizable composition containing diethylene glycol bisallyl carbonate.

In order to obtain a three-dimensionally crosslinked optical resin, the monomers may include a monomer having two or more polymerizable unsaturated bonds in the molecule. Examples of polymerizable unsaturated bonds include (meth)acrylate groups, allyl groups, and vinyl groups. Here, the (meth)acrylate group is at least one selected from the group consisting of methacrylate groups and acrylate groups. Among these, the polymerizable unsaturated bond may be at least one selected from the group consisting of methacrylate groups and allyl groups.

Monomers having two or more polymerizable unsaturated bonds in the molecule may include diethylene glycol bisallyl carbonate or may be diethylene glycol bisallyl carbonate, benzyl methacrylate, diallyl phthalate and an alkyl methacrylate having 1 to 4 carbon atoms in the alkyl group.

The amount of diethylene glycol bisallyl carbonate added with respect to a total amount of monomers may be 5 mass % or more, may be 10 mass % or more, may be 20 mass % or more, and may be 100 mass % or less, may be 80 mass % or less, may be 50 mass % or less, or may be 40 mass % or less.

When used in combination with benzyl methacrylate, diallyl phthalate and an alkyl methacrylate having 1 to 4 carbon atoms in the alkyl group, the amount of diethylene glycol bisallyl carbonate added with respect to a total amount of monomers is may be 5 mass % or more, may be 10 mass % or more, may be 20 mass % or more, or may be 40 mass % or less, or may be 35 mass % or less.

The amount of benzyl methacrylate added with respect to a total amount of monomers may be 5 mass % or more, may be 10 mass % or more, may be 15 mass % or more, and may be 40 mass % or less, may be 30 mass % or less, or may be 25 mass % or less.

As the diallyl phthalate, one or two selected from the group consisting of diallyl isophthalate and diallyl terephthalate may be exemplified.

The amount of diallyl phthalate added with respect to a total amount of monomers may be 14 mass % or more, may be 20 mass % or more, may be 30 mass % or more, and may be 88 mass % or less, may be 70 mass % or less, or may be 60 mass % or less.

As the alkyl methacrylate having 1 to 4 carbon atoms in the alkyl group, at least one selected from the group consisting of methyl methacrylate, ethyl methacrylate, n-propyl methacrylate, iso-propyl methacrylate, n-butyl methacrylate, sec-butyl methacrylate, iso-butyl methacrylate, and tert-butyl methacrylate may be exemplified.

The amount of alkyl methacrylate added with respect to a total amount of monomers may be 1 mass % or more, may be 2 mass % or more, may be 3 mass % or more, and may be 6 mass % or less, or may be 5 mass % or less.

Examples of radical initiators used for polymerization include 1,1-azobiscyclohexane carbonate, diisopropyl peroxycarbonate, 1,1'-azobiscyclohexane nitrate, and di-tert-butyl peroxide.

The amount of the radical initiator added with respect to 100 parts by mass of monomers may be 0.1 parts by mass or more, may be 0.5 parts by mass or more, may be 1.0 parts by mass or more, and may be 10 parts by mass or less, may be 8 parts by mass or less, or may be 5 parts by mass or less.

Acrylic Resin

The acrylic resin is a cured product of a polymerizable composition containing an acrylic compound. Here, the polymerizable composition may contain other monomers.

Examples of acrylic compounds include polyfunctional (meth)acrylate compounds having an aromatic ring, a polyalkylene glycol di(meth)acrylate, and monofunctional acrylates.

Among these, the acrylic compound may include a polyfunctional (meth)acrylate compound having an aromatic ring and a polyalkylene glycol di(meth)acrylate.

Examples of polyfunctional (meth)acrylate compounds having an aromatic ring include an alkylene oxide-modified bisphenol A having a (meth)acryloyl group at both ends and an alkylene oxide-modified and urethane-modified bisphenol A having a (meth)acryloyl group at both ends.

Among these, the polyfunctional (meth)acrylate compound may be an alkylene oxide-modified bisphenol A having a (meth)acryloyl group at both ends.

The alkylene oxide-modified bisphenol A having a (meth)acryloyl group at both ends may be a compound represented by Formula (2):

[C3]

(2)

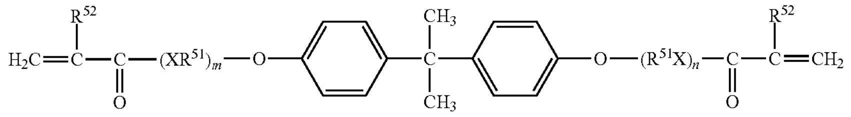

[where, $R^{51}$ is an ethylene group or a propylene group, $R^{52}$ is a hydrogen atom or a methyl group, X is an oxygen atom or a sulfur atom, and may be an oxygen atom, m and n are an average number of moles added, and m+n is 1.5 to 6, and may be 2 to 4].

Examples of alkylene oxide-modified bisphenol A having a (meth)acryloyl group at both ends include 2,2-bis[4-[2-((meth)acryloyloxy)ethoxy]phenyl]propane, and 2,2-bis[4-[2-((meth)acryloyloxy)ethoxy]-3,5-dibromophenyl]propane.

The content of the polyfunctional (meth)acrylate compound having an aromatic ring in the polymerizable composition may be 40 mass % or more, may be 50 mass % or more, may be 55 mass % or more, and may be 90 mass % or less, may be 80 mass % or less, or may be 70 mass % or less.

Examples of polyalkylene glycol di(meth)acrylate include diethylene glycol di(meth)acrylate, triethylene glycol di(meth)acrylate, tetraethylene glycol di(meth)acrylate, dipropylene glycol di(meth)acrylate, tripropylene glycol di(meth) acrylate, tetrapropylene glycol di(meth)acrylate, dibutylene glycol di(meth)acrylate, tributylene glycol di(meth)acrylate, and tetrabutylene glycol di(meth)acrylate.

The content of polyalkylene glycol di(meth)acrylate in the polymerizable composition may be 10 mass % or more, may be 20 mass % or more, may be 30 mass % or more, and may be 60 mass % or less, may be 50 mass % or less, or may be 45 mass % or less.

Examples of monofunctional (meth)acrylates include phenyl(meth)acrylate, benzyl(meth)acrylate, phenoxyethyl (meth)acrylate, 3-phenoxy-2-hydroxypropyl(meth)acrylate, 2-phenylphenyl(meth)acrylate, 4-phenylphenyl(meth)acrylate, 3-(2-phenylphenyl)-2-hydroxypropyl(meth)acrylate, 3-(4-phenylphenyl)-2-hydroxypropyl(meth)acrylate, 1-naphthyloxyethyl(meth)acrylate, 2-naphthyloxyethyl (meth)acrylate, 2,4,6-tribromophenyl(meth)acrylate, 2,4,6-tribromophenoxyethyl(meth)acrylate, 2,4,6-tribromophenyl-di(oxyethyl)-(meth)acrylate, and 2,4,6-tribromobenzyl (meth)acrylate.

A total content of the polymerizable component in the polymerizable composition may be 80 mass % or more, may be 85 mass % or more, may be 90 mass % or more, and may be 99 mass % or less, or may be 95 mass % or less.

When the polymerizable composition contains an acrylic compound, it may contain a radical polymerization initiator. Examples of radical polymerization initiators include energy ray-sensitive polymerization initiators and heat-sensitive polymerization initiators.

Examples of energy ray-sensitive polymerization initiators include 2-hydroxy-2-methyl-1-phenylpropan-1-one, hydroxycyclohexylphenyl ketone, methylphenylglyoxylate, and 2,4,6-trimethylbenzoyldiphenylphosphine oxide.

Examples of heat-sensitive polymerization initiators include organic peroxides and azo compounds.

Examples of organic peroxides include peroxyesters such as tert-butyl peroxyneodecanoate, tert-butyl peroxypivalate, tert-butyl peroxyisobutyrate, tert-butyl peroxyacetate, cumyl peroxyneodecanoate, tert-butyl peroxyoctoate, tert-butyl peroxyisopropyl carbonate, cumyl peroxyoctoate, tert-hexyl peroxyneodecanoate, tert-hexyl peroxypivalate, and tert-butyl peroxyneohexanoate; peroxyketals such as 1,1-bis (tert-butylperoxy)-3,3,5-trimethylcyclohexane, 1,1-bis(tert-butylperoxy)cyclohexane, 2,2-bis(tert-butylperoxy)octane, and 2,2-bis(tert-butylperoxy)butane; diacyl peroxides such as acetyl peroxide, isobutyryl peroxide, octanoyl peroxide, lauroyl peroxide, benzoyl peroxide, and m-toluoyl peroxide; and peroxydicarbonates such as diisopropyl peroxydicarbonate, and di-n-propyl peroxydicarbonate.

Examples of azo compounds include 2,2'-azobisisobutyrolnitrile, 1,1'-azobis(cyclohexane-1-carbonitrile), 2,2'-azobis(2-methylbutyronitrile), 2,2'-azobis(2,4-dimethylvaleronitrile), dimethyl-2,2'-azobisisobutyrate, and 2,2'-azobis (2,4,4-trimethylpentane).

The amount of the radical polymerization initiator added with respect to a total amount of 100 parts by mass of the acrylic compound may be 0.01 parts by mass or more, may be 0.1 parts by mass or more, may be 0.5 parts by mass or more, and may be 10 parts by mass or less, may be 5 parts by mass or less, or may be 3 parts by mass or less.

The lens substrate may contain other additives such as a mold releasing agent, a coloring agent, an antioxidant, an anti-coloring agent, and a fluorescent brightening agent. These may be used alone or two or more thereof may be used.

Mold Releasing Agent

Examples of mold releasing agents include phosphate ester compounds such as isopropyl acid phosphate, butyl acid phosphate, octyl acid phosphate, nonyl acid phosphate, decyl acid phosphate, isodecyl acid phosphate, isodecyl acid phosphate, tridecyl acid phosphate, stearyl acid phosphate, propyl phenyl acid phosphate, butyl phenyl acid phosphate, and butoxyethyl acid phosphate. The phosphate ester compound may be either a phosphate mono-ester compound or a phosphate di-ester compound, and may be a mixture of a phosphate mono-ester compound and a phosphate di-ester compound.

The amount of the mold releasing agent added with respect to a total amount of 100 parts by mass of the resin may be 0.01 parts by mass or may be 0.05 parts by mass or more, and may be 1.00 part by mass or less, and may be 0.50 parts by mass or less.

Coloring Agent

The lens substrate may contain a coloring agent in a range in which the luminous transmittance to be described below is not impaired.

In order to make coloration caused by addition of the above Compound 1 inconspicuous, the lens substrate may contain a coloring agent L having a maximum absorption wavelength of 550 nm or more and 600 nm or less (hereinafter simply referred to as a "coloring agent L") at 20 ppm by mass in a toluene solution.

In order to make coloration caused by addition of the above Compound 1 inconspicuous, the lens substrate may contain a coloring agent S having a maximum absorption wavelength of 500 nm or more and less than 550 nm (hereinafter simply referred to as a "coloring agent S") at 20 ppm by mass in a toluene solution.

Coloring Agent L

In order to obtain a slightly bluish lens substrate with a favorable color tone, the coloring agent L has a maximum absorption wavelength of 550 nm or more and 600 nm or less at 20 ppm by mass in a toluene solution. Here, 20 ppm by mass in a toluene solution means the proportion of the solute with respect to the entire toluene solution.

In addition, in order to obtain a slightly bluish lens substrate with a favorable color tone, the maximum absorption wavelength of the coloring agent L may be 550 nm or may be 560 nm or more, and may be 580 nm or more. Here, in order to obtain a slightly bluish resin composition with a favorable color tone, the maximum absorption wavelength of the coloring agent L may be 600 nm or less, or may be 590 nm or less.

Examples of coloring agents L include C.I.Solvent Violet 11, 13, 14, 26, 31, 33, 36, 37, 38, 45, 47, 48, 51, 59, and 60; C.I.Disperse Violet 26, 27, 28. Among these, the coloring agent L may be C.I. Disperse Violet 27 or C.I.Solvent Violet 13, 31, in consideration of high stability and little change in the color tone even when the polymerizable composition is polymerized, may be C.I.Disperse Violet 27 or C.I.Solvent Violet 13, or may be C.I.Disperse Violet 27.

In order to obtain a slightly bluish lens substrate with a favorable color tone, the amount of the coloring agent L added with respect to the resin may be 10,000 ppb by mass or less, may be 3,000 ppb by mass or less, or may be 1,500 ppb by mass or less. In order to obtain a slightly bluish lens substrate with a favorable color tone, the amount of the coloring agent L added may be 200 ppb by mass or more, may be 300 ppb by mass or more, or may be 400 ppb by mass or more.

Coloring Agent S

In order to obtain a slightly bluish lens substrate with a favorable color tone, the coloring agent S has a maximum absorption wavelength of 500 nm or more and less than 550 nm at 20 ppm by mass in a toluene solution.

In addition, in order to obtain a slightly bluish lens substrate with a favorable color tone, the maximum absorption wavelength of the coloring agent S may be 500 nm or more, may be 510 nm or more, or may be 530 nm or more. Here, in order to obtain a slightly bluish lens substrate with a favorable color tone, the maximum absorption wavelength of the coloring agent L may be 545 nm or less.

In order to obtain a slightly bluish lens substrate with a favorable color tone, examples of coloring agents S include C.I.Solvent Red 24, 49, 52, 90, 91, 111, 118, 119, 122, 124, 125, 127, 130, 132, 143, 145, 146, 150, 151, 155, 160, 168, 169, 172, 175, 181, 207, 218, 222, 227, 230, 245, 247; and C.I.Acid Red 73, 80, 91, 92, 97, 138, 151, 211, 274, 289. Among these, the coloring agent S may be C.I.Solvent Red 52 or 146, in consideration of high stability and little change in the color tone even when the polymerizable composition is polymerized, may be C.I.Solvent Red 52.

In order to obtain a slightly bluish lens substrate with a favorable color tone, the amount of the coloring agent S added with respect to the resin may be 500 ppb by mass or less, may be 100 ppb by mass or less, or may be 50 ppb by mass or less. In order to obtain a slightly bluish lens substrate with a favorable color tone, the amount of the coloring agent S added may be 1 ppb by mass or more, may be 3 ppb by mass or more, or may be 5 ppb by mass or more.

The mass ratio of the coloring agent L and the coloring agent S [the mass of the coloring agent L/the mass of the coloring agent S] may be 5 or more and 500 or less in order to obtain a slightly bluish lens substrate with a favorable color tone.

The mass ratio of the coloring agent L and the coloring agent S may be 5 or more, may be 10 or more, may be 15 or more, or may be 20 or more. In addition, the mass ratio of the coloring agent L and the coloring agent S may be 500 or less, may be 200 or less, may be 100 or less, or may be 80 or less.

Structure of Lens Substrate, Etc.

The lens substrate may be either a finished lens or a semi-finished lens.

The surface shape of the lens substrate is not particularly limited, and may be flat, convex, concave or the like.

The lens substrate may be used for any application such as a single focal lens, a multifocal lens, and a progressive power lens. For example, as one example, for a progressive power lens, usually, a near portion region (near portion) and a progressive portion region (intermediate region) are included in the above lower region, and a distance portion region (distance portion) is included in an upper region.

As the lens substrate, a colorless lens substrate is usually used, but a lens substrate that is colored in a range in which the transparency is not impaired can also be used.

The lens substrate may be of a meniscus type. A "meniscus type" lens substrate means a lens substrate having a curved surface formed on both sides. When the meniscus type lens substrate contains the above Compound 1, it is possible to reduce astigmatism.

The optical center thickness of the lens substrate is not particularly limited, and may be 0.5 mm or more and 10.0 mm or less, may be 0.5 mm or more and 5.0 mm or less, may be 0.5 mm or more and 3.0 mm or less, or may be 0.5 mm or more and 2.0 mm or less.

The diameter of the lens substrate is not particularly limited, and is usually about 50 to 100 mm.

The refractive index ne of the lens substrate may be 1.52 or more, may be 1.53 or more, may be 1.55 or more, may be 1.58 or more, or may be 1.60 or more.

In order to enhance an effect of improving the Abbe number according to the inclusion of Compound 1, the refractive index ne of the lens substrate may be 1.70 or more, or may be 1.74 or more.

Here, although the upper limit of the refractive index ne of the lens substrate is not particularly limited, it may be, for example 1.80 or less.

In order to reduce blue light hazard, the transmittance of light with a wavelength of 410 nm in the lens substrate may be 5% or less, may be 3% or less, or may be 1.0% or less. The lower limit value of the transmittance of light with a wavelength of 410 nm is not particularly limited, and is, for example, 0.0% or more.

The transmittance of light with a wavelength of 430 nm in the lens substrate may be 70% or more, may be 72% or more, or may be 75% or more. When the transmittance of light with a wavelength of 430 nm is set while the above transmittance of light with a wavelength of 410 nm is provided, it is possible to reduce coloration or reduce the amount of the above dyeing agent used while reducing blue light hazard. The upper limit value of the transmittance of light with a wavelength of 430 nm is not particularly limited, and is, for example, 90% or less.

In order to reduce transmission of ultraviolet rays that are harmful to the eyes, the transmittance of light with a wavelength of 400 nm in the lens substrate may be 3% or less, may be 1% or less, or may be 0.0% or less.

The transmittance of light with a wavelength of 420 nm in the lens substrate may be 50% or less, may be 30% or less, or may be 20% or less. When the transmittance of light with a wavelength of 420 nm is set while the above transmittance of light with a wavelength of 410 nm is provided, it is possible to reduce blue light hazard. The lower limit value of the transmittance of light with a wavelength of 420 nm is not particularly limited, and is, for example, 0% or more.

The transmittance of light with a wavelength of 440 nm in the lens substrate may be 70% or more, may be 72% or more, or may be 75% or more. When the transmittance of light with a wavelength of 440 nm is set, it is possible to reduce coloration or reduce the amount of the above dyeing agent used. The upper limit value of the transmittance of light with a wavelength of 440 nm is not particularly limited, and is, for example, 95% or less.

The transmittance of light with a wavelength of 450 nm in the lens substrate may be 70% or more, may be 72% or more, or may be 75% or more. When the transmittance of light with a wavelength of 450 nm is set, it is possible to reduce coloration or reduce the amount of the above dyeing agent used. The upper limit value of the transmittance of light with a wavelength of 450 nm is not particularly limited, and is, for example, 95% or less.

The transmittance of light with a wavelength of 550 nm in the lens substrate may be 70% or more, may be 80% or more, or may be 85% or more. The upper limit value of the transmittance of light with a wavelength of 550 nm is not particularly limited, and is, for example, 95% or less.

The luminous transmittance of the lens substrate may be 70% or more, may be 80% or more, may be 84% or more, may be 85% or more, or may be 90% or more. The upper limit value of the luminous transmittance is not particularly limited, and is, for example, 100% or less, and may be 95% or less.

The above transmittance is the transmittance at the optical center of the lens substrate and can be measured using a spectrophotometer. As the spectrophotometer, for example, a "U-4100" (product name, commercially available from Hitachi, Ltd.) can be used. The above transmittance can be achieved by adjusting the content of Compound 1 according to the thickness of the lens substrate.

Method of Producing Lens Substrate

Although not particularly limited, the lens substrate can be obtained by, for example, a production method including a process of curing the above polymerizable composition and a process of annealing the cured resin.

The polymerization may be a cast polymerization method. For example, the lens substrate can be obtained by injecting a polymerizable composition into a mold in which a glass or metal mold and a tape or a gasket are combined and performing polymerization.

Polymerization conditions can be appropriately set according to the polymerizable composition. The polymerization start temperature may be 0° C. or higher, may be 10° C. or higher, and may be 50° C. or lower, or may be 40° C. or lower. The temperature may be raised from the polymerization start temperature, and curing by heating is then performed. For example, the maximum heating temperature is usually 110° C. or higher and 130° C. or lower.

After polymerization is completed, the lens substrate may be released from the mold and subjected to an annealing treatment. The temperature in the annealing treatment may be 100 to 150° C.

Hard Coat Layer

The hard coat layer is, for example, a cured film formed of a curable composition containing an inorganic oxide and a silicon compound. The curable composition may further contain a polyfunctional epoxy compound.

Examples of inorganic oxides include silicon oxide, aluminum oxide, titanium oxide, zirconium oxide, tungsten oxide, zinc oxide, tin oxide, beryllium oxide, antimony oxide, and composite oxides formed of two or more of these inorganic oxides. These may be used alone or two or more thereof may be used in combination. Among these, the inorganic oxide may be silicon oxide. Here, colloidal silica may be used as the inorganic oxide.

The content of the inorganic oxide in the solid content of the curable composition may be 20 mass % or more and 80 mass % or less, may be 25 mass % or more and 70 mass % or less, or may be 25 mass % or more and 50 mass % or less.

The silicon compound is, for example, a silicon compound having a hydrolyzable group such as an alkoxy group. The silicon compound may be a silane coupling agent containing an organic group and a hydrolyzable group bonded to silicon atoms. The organic group bonded to silicon atoms may be an organic group having a functional group, for example, an epoxy group such as a glycidoxy group, a vinyl group, a methacryloxy group, an acryloxy group, a mercapto group, an amino group, and a phenyl group, or may be an organic group having an epoxy group. Here, the silicon compound may have an alkyl group bonded to silicon.

Examples of commercial products of the silane coupling agents include KBM-303, KBM-402, KBM-403, KBE-402, KBE-403, KBM-1403, KBM-502, KBM-503, KBE-502, KBE-503, KBM-5103, KBM-602, KBM-603, KBM-903, KBE-903, KBE-9103, KBM-573, KBM-575, KBM-9659, KBE-585, KBM-802, KBM-803, KBE-846, and KBE-9007 (product name, commercially available from Shin-Etsu Chemical Co., Ltd.).

The content of the silicon compound in the solid content of the curable composition may be 20 mass % or more and 90 mass % or less, may be 30 mass % or more and 75 mass % or less, or may be 50 mass % or more and 75 mass % or less.

The polyfunctional epoxy compound is a polyfunctional epoxy compound containing two or more epoxy groups in one molecule, or may be a polyfunctional epoxy compound containing two or three epoxy groups in one molecule. Examples of commercial products of polyfunctional epoxy compounds include "Denacol" series EX-201, EX-211, EX-212, EX-252, EX-313, EX-314, EX-321, EX-411, EX-421, EX-512, EX-521, EX-611, EX-612, EX-614, and EX-614B (product name, commercially available from Nagase ChemteX Corporation).

The content of the polyfunctional epoxy compound in the solid content of the curable composition may be 0 mass % or more and 50 mass % or less, may be 10 mass % or more and 40 mass % or less, or may be 15 mass % or more and 30 mass % or less.

The above curable composition can be prepared by mixing optional components such as an organic solvent, a leveling agent, and a curing catalyst as necessary in addition to the components described above.

The above hard coat layer can be formed by applying a curable composition to the substrate and performing a curing treatment (thermal curing, photocuring, etc.). As a method of applying a curable composition, commonly used methods such as a dipping method, a spin coating method, and a spray method can be applied. The curing treatment is usually performed by performing heating on a curable composition containing a polyfunctional epoxy compound. For example, the heat curing treatment can be performed by disposing the lens coated with the above curable composition under an environment of an atmospheric temperature of 50 to 150° C. for about 30 minutes to 3 hours.

Foundation Layer

For example, the above foundation layer can be formed from an aqueous resin composition containing at least one resin particle selected from the group consisting of a polyurethane resin, an acrylic resin, and an epoxy resin.

As the above aqueous resin composition, a commercially available aqueous polyurethane can be used without change or one that is diluted with an aqueous solvent as necessary can be used. Examples of commercially available aqueous polyurethanes include “Evafanol” series (product name, commercially available from Nicca Chemical Co., Ltd.), “SuperFlex” series (product name, commercially available from DKS Co., Ltd.), “Adeka Bontighter” series (product name, commercially available from ADEKA Corporation), “Olester” series (product name, commercially available from Mitsui Chemicals Inc), “Bondic” series and “Hydran” series (product name, commercially available from Dainippon Ink and Chemicals, Inc.), “Impranil” series (product name, commercially available from Bayer AG), “Soflanate” series (product name, commercially available from Japan Soflan Co., Ltd.), “Poiz” series (product name, commercially available from Kao Corporation), “Sanprene” series (product name, commercially available from Sanyo Chemical Industries, Ltd.), “Aizerax” series (product name, commercially available from Hodogaya Chemical Co., Ltd.), and “NeoRez” series (product name, commercially available from AstraZeneca).

The foundation layer can be formed, for example, by applying the above aqueous resin composition to the surface of the substrate and drying it.

Functional Layer

Examples of the above functional layers include an antireflection layer, a UV absorbing layer, an infrared light absorbing layer, a photochromic layer, an antistatic layer, and an anti-fogging layer. These functional layers may be used alone or two or more thereof may be used in combination. For these functional layers, known techniques related to spectacle lenses can be applied. Among these, the spectacle lens may have an antireflection layer.

Antireflection Layer

For example, the antireflection layer has low refractive index layers and high refractive index layers that are alternately arranged. The number of layers that the antireflection layer has may be 4 to 11 or may be 5 to 8.

The refractive index of the low refractive index layer may be 1.35 to 1.80 or may be 1.45 to 1.50 at a wavelength of 500 to 550 nm. The low refractive index layer is formed of an inorganic oxide or may be formed of silicon oxide.

The refractive index of the high refractive index layer may be 1.90 to 2.60 or may be 2.00 to 2.40 at a wavelength of 500 to 550 nm. The high refractive index layer is formed of, for example, an inorganic oxide. The inorganic oxide used for the high refractive index layer may be at least one selected from the group consisting of zirconium oxide, tantalum oxide, yttrium oxide, titanium oxide, niobium oxide and aluminum oxide, or may be at least one selected from the group consisting of zirconium oxide and tantalum oxide.

For the antireflection layer, low refractive index layers and high refractive index layers can be alternately laminated by a vacuum deposition method to form an antireflection layer.

Water-Repellent Layer

The water-repellent layer is formed using a water-repellent material composition to be described below. The water-repellent layer may be formed on the hard coat layer or formed on the functional layer, but may be formed on the antireflection layer. Moreover, the water-repellent layer may be positioned on the outermost surface.

Physical Properties of Spectacle Lens

In order to reduce blue light hazard, the transmittance of light with a wavelength of 410 nm in the entire spectacle lens may be 5% or less, may be 3% or less, or may be 1.0% or less. The lower limit value of the transmittance of light with a wavelength of 410 nm is not particularly limited, and is, for example, 0.0% or more.

The transmittance of light with a wavelength of 430 nm in the entire spectacle lens may be 70% or more, may be 72% or more, or may be 75% or more. When the transmittance of light with a wavelength of 430 nm is set while the above transmittance of light with a wavelength of 410 nm is provided, it is possible to reduce coloration or reduce the amount of the above dyeing agent used while reducing blue light hazard. The upper limit value of the transmittance of light with a wavelength of 430 nm is not particularly limited, and is, for example, 90% or less.

In order to reduce transmission of ultraviolet rays that are harmful to the eyes, the transmittance of light with a wavelength of 400 nm in the entire spectacle lens may be 3% or less, may be 1% or less, or may be 0.0% or less.

The transmittance of light with a wavelength of 420 nm in the entire spectacle lens may be 50% or less, may be 30% or less, or may be 20% or less. When the transmittance of light with a wavelength of 420 nm is set while the above transmittance of light with a wavelength of 410 nm is provided, it is possible to reduce blue light hazard. The lower limit value of the transmittance of light with a wavelength of 420 nm is not particularly limited, and is, for example, 0% or more.

The transmittance of light with a wavelength of 440 nm in the entire spectacle lens may be 70% or more, may be 72% or more, or may be 75% or more. When the transmittance of light with a wavelength of 440 nm is set, it is possible to reduce coloration or reduce the amount of the above dyeing agent used. The upper limit value of the transmittance of light with a wavelength of 440 nm is not particularly limited, and is, for example, 95% or less.

The transmittance of light with a wavelength of 450 nm in the entire spectacle lens may be 70% or more, may be 72% or more, or may be 75% or more. When the transmittance of light with a wavelength of 450 nm is set, it is possible to reduce coloration or reduce the amount of the above dyeing agent used. The upper limit value of the transmittance of light with a wavelength of 450 nm is not particularly limited, and is, for example, 95% or less.

The transmittance of light with a wavelength of 550 nm in the entire spectacle lens may be 70% or more, may be 80% or more, or may be 85% or more. The upper limit value of the transmittance of light with a wavelength of 550 nm is not particularly limited, and is, for example, 95% or less.

The luminous transmittance of the spectacle lens may be 70% or more, may be 80% or more, may be 84% or more, may be 85% or more, or may be 90% or more. The upper limit value of the luminous transmittance is not particularly limited, and is, for example, 100% or less, and may be 95% or less.

The above transmittance is the transmittance at the optical center of the spectacle lens and can be measured using a spectrophotometer. As the spectrophotometer, for example, a "U-4100" (product name, commercially available from Hitachi, Ltd.) can be used. The above transmittance can be achieved by adjusting the content of Compound 1 according to the thickness of the spectacle lens.

EXAMPLES

Hereinafter, the present embodiment will be described in more detail with reference to examples and comparative examples. Here, the present disclosure is not limited to the following examples.

Measurement Method

Transmittance

The transmittance of light with each wavelength was measured using a spectrophotometer "U-4100" (product name, commercially available from Hitachi, Ltd.). Here, the transmittance measurement point was the optical center of the spectacle lens and the lens substrate.

Maximum Absorption Wavelength (λmax)

The maximum absorption wavelength (λmax) of the coloring agent was measured using a spectrophotometer "U-4100" (product name, commercially available from Hitachi, Ltd.) under the following conditions.

Sample: toluene solution (content of coloring agent: 20 ppm by mass)
Measurement mode: transmittance
Optical path length: 10 mm

Molar Extinction Coefficient

A chloroform solution with a sample concentration of 10 ppm by mass was prepared. For the solution, the absorption spectrum was measured using a UV-visible spectrophotometer "V-650DS" (product name, commercially available from JASCO Corporation) (quartz cell, optical path length; 1 cm), and the maximum value of the molar extinction coefficient ε at a measurement wavelength of 359 nm was calculated using the Lambert-Beer law.

Luminous Transmittance

The luminous transmittance was measured according to JIS T7333: 2005. Here, the transmittance measurement point was the optical center of the spectacle lens and the lens substrate.

Refractive Index and Abbe Number of Lens

The refractive index of the spectacle lens was measured using a precision refractometer "KPR-2000 type" (commercially available from Kalnew Optical Industrial Co., Ltd.) at F'-line (488.0 nm), C'-line (643.9 nm), and e-line (546.1 nm) at 20° C. Then, the Abbe number was calculated from the following formula.

$$\text{Abbe number } \nu e=(ne-1)/(nF'-nC')$$

ne is a refractive index measured at the e-line, nF' is a refractive index measured at the F'-line, and nC' is a refractive index measured at the C'-line.

Blue LP Test

A laser beam was applied to the optical central part of the spectacle lens with a laser pointer (LP) with an emission wavelength of 405±10 nm (output<1 mW), and it was checked whether the laser beam passed through.

Evaluation Criteria

O: the laser beam has decreased significantly
Δ: the laser beam has decreased slightly
x: the laser beam has passed through

Example 1

0.06 parts by mass of dimethyltin dichloride as a catalyst, 0.15 parts by mass of an acidic phosphate ester "JP-506H" (product name, commercially available from Johoku Chemical Co., Ltd.) as a mold releasing agent, 0.55 parts by mass of 2-ethylhexyl 2-(2-hydroxy-4-ethoxyphenyl)2H-benzotriazole-5-carboxylate, 0.1037 parts by mass of Disperse Violet 27 (the maximum absorption wavelength at 20 ppm by mass in a toluene solution was 586 nm) and 0.0013 parts by mass of Solvent Red 52 (the maximum absorption wavelength at 20 ppm by mass in a toluene solution was 543 nm) were added to 50.28 parts by mass of a mixture of 2,5-bis(isocyanatomethyl)-bicyclo[2.2.1]heptane and 2,6-bis(isocyanatomethyl)-bicyclo[2.2.1]heptane, and stirred and mixed. Then, 25.50 parts by mass of pentaerythritol tetrakis(3-mercaptopropionate), and 24.22 parts by mass of 1,2-bis(2-mercaptoethylthio)-3-mercaptopropane were additionally added thereto and the mixture was stirred and mixed under a reduced pressure of 10 mmHg for 30 minutes to prepare a curable composition. Next, this curable composition was injected into a lens molding mold composed of a glass mold and a resin gasket prepared in advance (0.00D, the wall thickness was set to 1.6 mm) and polymerized in an electric furnace at 20° C. to 120° C. for 24 hours. After polymerization was completed, the gasket and the mold were removed and a heat treatment was then performed at 120° C. for 2 hours to obtain a lens substrate. The optical properties and the spectral transmittance of the obtained lens substrate were measured, and the results are shown in Table 2. Here, the luminous transmittance was 88.6%.

Examples 2 to 4 and Comparative Examples 1 to 8

Lens substrates were obtained in the same method as in Example 1 except that the raw material composition was changed as shown in Table 1. The optical properties and the spectral transmittance of the obtained lens substrates were measured, and the results are shown in Table 2. Here, the luminous transmittance of the lens substrate of Example 3 was 88.0%.

Example 5

79.92 parts by mass of bis-(β-epithiopropyl)sulfide, 14.00 parts by mass of sulfur, and 0.25 parts by mass of Compound 1-1 were put into a 300 mL eggplant flask, and degassing was performed for 60 minutes while heating to 60° C. Then, 0.467 parts by mass of 1-methyl-2-mercapto-1H-imidazole was added thereto, a preliminary reaction was performed at 60° C. for 60 minutes while stirring in a sealed state at atmospheric pressure, and the sample was then cooled to 20° C., and 0.13 parts by mass of dibutyltin dichloride was added to stop the preliminary reaction.

In a separate container, 6.08 parts by mass of bis-(2-mercaptoethyl)sulfide, 0.001 parts by mass of an acidic phosphate ester "JP506H" (product name, commercially available from Johoku Chemical Co., Ltd.), and 0.020 parts by mass of tetrabutylphosphonium bromide were added to a sample obtained by adding, mixing, dissolving and pre-reacting 1,050 ppb by mass of Disperse Violet 27 (the maximum absorption wavelength at 20 ppm by mass in a toluene solution was 586 nm) as a bluing agent and 450 ppb by mass of Solvent Red 52 (the maximum absorption wavelength at 20 ppm by mass in a toluene solution was 543 nm) and the sample was degassed while stirring at 20° C. to obtain a uniform liquid.

Then, while filtering through a 3 micron polyethylene terephthalate filter, the sample was injected into a lens molding mold (0.00D, the wall thickness was set to 2.00 mm) composed of a glass mold and a resin gasket, heated in an oven from 30° C. to 100° C. for 24 hours, polymerized and cured and the mold was then removed to obtain a lens substrate. The optical properties and the spectral transmittance of the obtained lens substrate were measured, and the results are shown in Table 4. Here, the luminous transmittance was 84.2%.

Comparative Examples 9 and 10

Lens substrates were obtained in the same method as in Example 9 except that the raw material composition was changed as shown in Table 3. The optical properties and the spectral transmittance of the obtained lens substrates were measured, and the results are shown in Table 4.

Example 6

In a 300 mL eggplant flask, 95.00 parts by mass of bis-(β-epithiopropyl)disulfide, 5.00 parts by mass of a mixture of 4,7-bis(mercaptomethyl)-3,6,9-trithiaundecane-1,11-dithiol, 4,8-bis(mercaptomethyl)-3,6,9-trithiaundecane-1,11-dithiol and 5,7-bis(mercaptomethyl)-3,6,9-trithiaundecane-1,11-dithiol and 0.40 parts by mass of Compound 1-1, 0.001 parts by mass of an acidic phosphate ester "JP506H" (product name, commercially available from Johoku Chemical Co., Ltd.), 1,400 ppb by mass of Disperse Violet 27 (the maximum absorption wavelength at 20 ppm by mass in a toluene solution was 586 nm) as a bluing agent, 600 ppb by mass of Solvent Red 52 (the maximum absorption wavelength at 20 ppm by mass in a toluene solution was 543 nm), and 0.10 parts by mass of dicyclohexylmethylamine were added and degassed at 20° C. for 60 minutes to obtain a uniform liquid.

Then, while filtering through a 3 micron polyethylene terephthalate filter, the sample was injected into a lens molding mold (0.00D, the wall thickness was set to 2.00 mm) composed of a glass mold and a resin gasket, heated in an oven from 30° C. to 100° C. for 24 hours, polymerized and cured and the mold was then removed to obtain a lens substrate. The optical properties and the spectral transmittance of the obtained lens substrate were measured, and the results are shown in Table 4.

Comparative Example 11

A lens substrate was obtained in the same method as in Example 6 except that the raw material composition was changed as shown in Table 3. The optical properties and the spectral transmittance of the obtained lens substrate were measured, and the results are shown in Table 4.

TABLE 1

| | Compound | | | | Main raw material | |
|---|---|---|---|---|---|---|
| | Type | Maximum absorption wavelength (mm) | Molar extinction coefficient εmax | Amount added (parts by mass) | Isocyanate component | Amount added (parts by mass) |
| Example 1 | Compound 1-1 | 359 | 28400 | 0.55 | NBDI | 50.28 |
| Example 2 | | 359 | 28400 | 0.50 | HXDI | 47.53 |
| Example 3 | | 359 | 28400 | 0.30 | XDI | 50.60 |
| Example 4 | | 359 | 28400 | 0.30 | XDI | 52.03 |
| Comparative Example 1 | Compound 51 | 345 | 25800 | 1.00 | NBDI | 50.28 |
| Comparative Example 2 | Compound 52 | 353 | 16400 | 1.00 | NBDI | 50.28 |
| Comparative Example 3 | Compound 51 | 345 | 25800 | 1.00 | HXDI | 47.53 |
| Comparative Example 4 | Compound 51 | 345 | 25800 | 0.45 | XDI | 50.60 |

TABLE 1-continued

| | | | | | | |
|---|---|---|---|---|---|---|
| Comparative Example 5 | Compound 52 | 353 | 16400 | 0.65 | XDI | 50.60 |
| Comparative Example 6 | Compound 53 | 342 | 16200 | 1.25 | XDI | 50.60 |
| Comparative Example 7 | Compound 51 | 345 | 25800 | 0.45 | XDI | 52.03 |
| Comparative Example 8 | Compound 52 | 353 | 16400 | 0.65 | XDI | 52.03 |

| | Main raw material | | | | Bluing agent | |
|---|---|---|---|---|---|---|
| | Thiol component (1) | Amount added (parts by mass) | Thiol component (2) | Amount added (parts by mass) | Blue series (ppb by mass) | Red series (ppb by mass) |
| Example 1 | PETMP | 25.50 | TFSH | 24.22 | 1037 | 13 |
| Example 2 | PETMA | 26.47 | DMMD | 26.00 | 0 | 0 |
| Example 3 | FFSH | 49.40 | — | — | 1170 | 30 |
| Example 4 | TFSH | 47.97 | — | — | 1170 | 30 |
| Comparative Example 1 | PETMP | 25.50 | TFSH | 24.22 | 415 | 5 |
| Comparative Example 2 | PETMP | 25.50 | TFSH | 24.22 | 3950 | 50 |
| Comparative Example 3 | PETMA | 26.47 | DMMD | 26.00 | 0 | 0 |
| Comparative Example 4 | FFSH | 49.40 | — | — | 585 | 15 |
| Comparative Example 5 | FFSH | 49.40 | — | — | 2450 | 420 |
| Comparative Example 6 | FFSH | 49.40 | — | — | 450 | 0 |
| Comparative Example 7 | TFSH | 47.97 | — | — | 585 | 15 |
| Comparative Example 8 | TFSH | 47.97 | — | — | 2450 | 420 |

TABLE 2

| | Optical center thickness | Optical properties | | Spectral transmittance (%) (nm) | | | | | | | Blue LP |
|---|---|---|---|---|---|---|---|---|---|---|---|
| | (mm) | ne | ve | 400 | 410 | 420 | 430 | 440 | 450 | 550 | test |
| Example 1 | 1.6 | 1.60 | 40.5 | 0.0 | 0.6 | 33.7 | 78.1 | 87.9 | 89.2 | 88.5 | ○ |
| Example 2 | 1.6 | 1.60 | 40.5 | 0.0 | 0.8 | 41.5 | 81.6 | 88.9 | 89.9 | 89.8 | ○ |
| Example 3 | 1.8 | 1.67 | 31.0 | 0.0 | 0.3 | 26.8 | 72.7 | 85.3 | 87.1 | 86.4 | ○ |
| Example 4 | 1.8 | 1.67 | 31.0 | 0.0 | 0.4 | 27.4 | 73.3 | 85.5 | 87.3 | 86.4 | ○ |
| Comparative Example 1 | 1.6 | 1.60 | 39.5 | 17.2 | 71.0 | 87.8 | 89.3 | 89.5 | 89.5 | 89.2 | X |
| Comparative Example 2 | 1.6 | 1.60 | 39.5 | 0.0 | 0.2 | 20.0 | 67.5 | 85.1 | 88.4 | 86.3 | ○ |
| Comparative Example 3 | 1.6 | 1.60 | 39.5 | 17.4 | 71.2 | 87.9 | 89.4 | 89.6 | 89.6 | 90.3 | X |
| Comparative Example 4 | 1.8 | 1.67 | 30.5 | 17.8 | 72.5 | 85.2 | 87.0 | 87.4 | 87.5 | 87.4 | X |
| Comparative Example 5 | 2.0 | 1.67 | 30.5 | 0.0 | 0.0 | 14.8 | 62.0 | 82.6 | 86.9 | 84.1 | ○ |
| Comparative Example 6 | 2.0 | 1.67 | 30.0 | 2.6 | 51.3 | 81.1 | 86.5 | 87.4 | 87.6 | 86.8 | X |
| Comparative Example 7 | 1.8 | 1.67 | 30.5 | 2.8 | 49.0 | 76.1 | 83.6 | 86.2 | 87.2 | 86.7 | X |
| Comparative Example 8 | 1.8 | 1.67 | 30.5 | 0.0 | 1.0 | 16.8 | 63.0 | 82.3 | 86.3 | 84.2 | ○ |

TABLE 3

| | Compound | | | | Main raw material | |
|---|---|---|---|---|---|---|
| | Type | Maximum absorption wavelength (mm) | Molar extinction coefficient εmax | Amount added (parts by mass) | Epithio compound | Amount added (parts by mass) |
| Example 5 | Compound 1-1 | 359 | 28400 | 0.25 | ETPS | 79.92 |
| Example 6 | | 359 | 27800 | 0.40 | ETPDS | 95.00 |
| Comparative Example 9 | Compound 54 | 345 | 24700 | 1.75 | ETPS | 79.92 |

TABLE 3-continued

| | | | | | | |
|---|---|---|---|---|---|---|
| Comparative Example 10 | Compound 52 | 353 | 16400 | 0.32 | ETPS | 79.92 |
| Comparative Example 11 | Compound 53 | 342 | 16200 | 0.88 | ETPDS | 95.00 |

| | Main raw material | | | | Bluing agent | |
|---|---|---|---|---|---|---|
| | Vulcanizing agent | Amount added (parts by mass) | Thiol compound | Amount added (parts by mass) | Blue series (ppb by mass) | Red series (ppb by mass) |
| Example 5 | sulfur | 14.00 | MES | 6.08 | 1050 | 450 |
| Example 6 | — | — | FFSH | 5.00 | 1400 | 600 |
| Comparative Example 9 | sulfur | 14.00 | MES | 6.08 | 700 | 300 |
| Comparative Example 10 | sulfur | 14.00 | MES | 6.08 | 3500 | 1000 |
| Comparative Example 11 | — | — | FFSH | 5.00 | 700 | 300 |

TABLE 4

| | Optical center thickness | Optical properties | | Spectral transmittance (%) (nm) | | | | | | | Blue LP |
|---|---|---|---|---|---|---|---|---|---|---|---|
| | (mm) | ne | νe | 400 | 410 | 420 | 430 | 440 | 450 | 550 | test |
| Example 5 | 2.0 | 1.74 | 32.5 | 0.0 | 0.6 | 38.2 | 76.5 | 84.1 | 85.5 | 84.9 | ○ |
| Example 6 | 2.0 | 1.74 | 32.5 | 0.0 | 0.0 | 21.6 | 70.5 | 82.7 | 84.8 | 82.4 | ○ |
| Comparative Example 9 | 2.0 | 1.74 | 31.0 | 0.0 | 24.2 | 72.3 | 82.1 | 84.1 | 85.0 | 84.8 | X |
| Comparative Example 10 | 2.0 | 1.74 | 32.0 | 0.0 | 0.4 | 23.4 | 65.6 | 81.6 | 84.9 | 82.0 | ○ |
| Comparative Example 11 | 2.0 | 1.74 | 31.0 | 1.3 | 41.2 | 74.9 | 82.7 | 84.5 | 85.2 | 84.6 | X |

Abbreviations in the table are as follows.

Compound 1-1: 2-ethylhexyl 2-(2-hydroxy-4-ethoxyphenyl)2H-benzotriazole-5-carboxylate Compound 51: 2-(2-hydroxy-4-octyloxyphenyl)2H-benzotriazole Compound 52: 2-(3-tert-butyl-2-hydroxy-5-methylphenyl)-5-chloro-2H-benzotriazole Compound 53: 2-(2-hydroxy-5-methylphenyl)2H-benzotriazole Compound 54: 2-(2-hydroxy-4-ethoxyphenyl)2H-benzotriazole NBDI: mixture of 2,5-bis(isocyanatomethyl)-bicyclo [2.2.1]heptane and 2,6-bis(isocyanatomethyl)-bicyclo [2.2.1]heptane PETMP: pentaerythritol tetrakis(3-mercaptopropionate)

TFSH: 1,2-bis(2-mercaptoethylthio)-3-mercaptopropane

HXDI: 1,3-bis(isocyanatomethyl)cyclohexane

PETMA: pentaerythritol tetrakis(2-mercaptoacetate)

DMMD: 2,5-bis(mercaptomethyl)-1,4-dithiane

XDI: 1,3-bis(isocyanatomethyl)benzene

FFSH: a mixture of 4,7-bis(mercaptomethyl)-3,6,9-trithiaundecane-1,11-dithiol, 4,8-bis(mercaptomethyl)-3,6,9-trithiaundecane-1,11-dithiol and 5,7-bis(mercaptomethyl)-3,6,9-trithiaundecane-1,11-dithiol ETPS: bis-(β-epithiopropyl)sulfide MES: bis-(2-mercaptoethyl)sulfide ETPDS: bis-(β-epithiopropyl)disulfide

The invention claimed is:

1. A spectacle lens comprising:

a lens substrate that contains

Compound 1 having a maximum absorption wavelength of 350 nm or more and 365 nm or less and a molar extinction coefficient of 20,000 l/mol·cm or more, and a resin, wherein, the lens substrate has a refractive index ne of 1.58 or more and 1.80 or less.

2. The spectacle lens according to claim 1, comprising 0.05 parts by mass or more and 2.00 parts by mass or less of the Compound 1 with respect to 100 parts by mass of the resin.

3. The spectacle lens according to claim 1, comprising 0.05 parts by mass or more and 0.60 parts by mass or less of the Compound 1 with respect to 100 parts by mass of the resin.

4. The spectacle lens according to claim 1, wherein a transmittance of light with a wavelength of 410 nm in the entire spectacle lens is 5% or less, and wherein a transmittance of light with a wavelength of 430 nm in the entire spectacle lens is 70% or more.

5. The spectacle lens according to claim 1, comprising a coloring agent L having a maximum absorption wavelength of 550 nm or more and 600 nm or less at 20 ppm by mass in a toluene solution.

6. The spectacle lens according to claim 1, comprising a coloring agent S having a maximum absorption wavelength of 500 nm or more and less than 550 nm at 20 ppm by mass in a toluene solution.

7. The spectacle lens according to claim 1, wherein the resin is a cured product of an isocyanate component containing: at least one selected from the group consisting of bis(isocyanatomethyl) bicyclo [2.2.1]heptane, bis(isocyanatomethyl)cyclohexane, bis (isocyanatomethyl)benzene, tolylene diisocyanate, diphenylmethane diisocyanate, dicyclohexylmethane diisocyanate, hexamethylene diisocyanate, and pentamethylene diisocyanate; and an active hydrogen compound component.

8. The spectacle lens according to claim 7, wherein the active hydrogen compound component contains at least one selected from the group consisting of toluenediamine, pentaerythritol tetrakismercaptoacetate, pentaerythritol tetrakismercaptopropionate, trimethylolpropane trismercaptoacetate, trimethylolpropane trismercaptopropionate, bis(mercaptoethylthio) mercaptopropane, bis(mercaptomethyl)-3,6,9-trithiaundecandithiol, dimercaptoethyl sulfide, bis(mercaptomethyl)dithiane, dimercaptoethyl ether, and diethylene glycol.

9. The spectacle lens according to claim 8, wherein the bis(mercaptomethyl)-3,6,9-trithiaundecandithiol is a mixture of 4,7-bis(mercaptomethyl)-3,6,9-trithiaundecane-1,11-dithiol, 4,8-bis(mercaptomethyl)-3,6,9-trithiaundecane-1,11-dithiol and 5,7-bis(mercaptomethyl)-3,6,9-trithiaundecane-1,11-dithiol.

10. The spectacle lens according to claim 1, wherein the resin is an episulfide resin.

11. The spectacle lens according to claim 1, wherein the refractive index ne of the lens substrate is 1.60 or more and 1.80 or less.

12. The spectacle lens according to claim 1, comprising at least one layer selected from the group consisting of a hard coat layer, a foundation layer, and an antireflection layer.

13. The spectacle lens according to claim 1, wherein the lens substrate is of a meniscus type.

14. The spectacle lens according to claim 13, wherein the optical center thickness of the spectacle lens is 0.5 mm or more and 10.0 mm or less.

15. The spectacle lens according to claim 2, wherein a transmittance of light with a wavelength of 410 nm in the entire spectacle lens is 5% or less, and wherein a transmittance of light with a wavelength of 430 nm in the entire spectacle lens is 70% or more.

16. The spectacle lens according to claim 15, comprising a coloring agent L having a maximum absorption wavelength of 550 nm or more and 600 nm or less at 20 ppm by mass in a toluene solution.

17. The spectacle lens according to claim 16, comprising a coloring agent S having a maximum absorption wavelength of 500 nm or more and less than 550 nm at 20 ppm by mass in a toluene solution.

18. The spectacle lens according to claim 1, wherein the refractive index ne of the lens substrate is 1.70 or more and 1.80 or less.

19. The spectacle lens according to claim 1, wherein the refractive index ne of the lens substrate is 1.74 or more and 1.80 or less.

* * * * *